Sept. 9, 1941.    R. E. WEIR    2,255,141
ARC WELDER
Filed Aug. 2, 1940
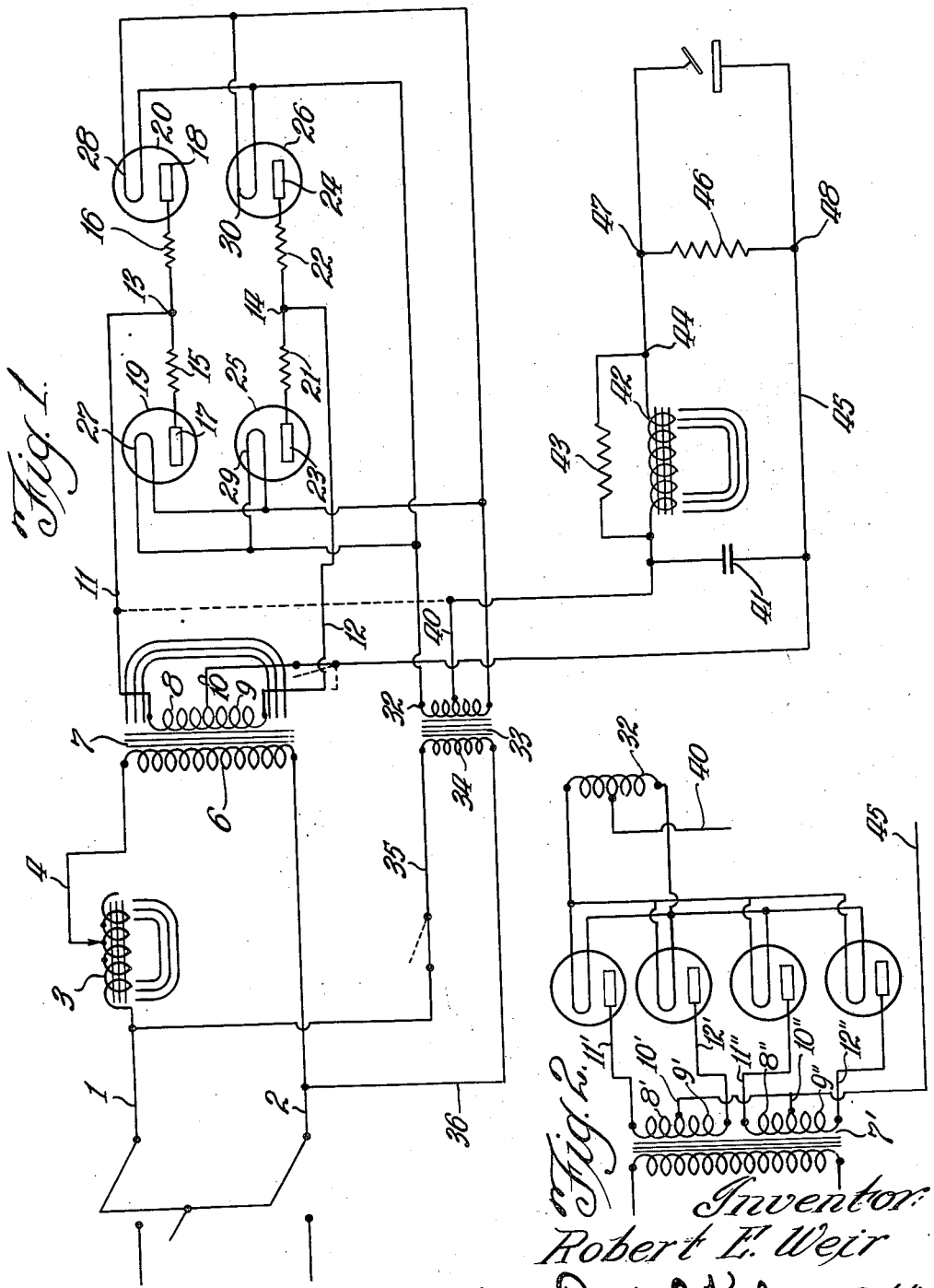

Patented Sept. 9, 1941

2,255,141

UNITED STATES PATENT OFFICE 2,255,141

ARC WELDER

Robert E. Weir, Chicago, Ill., assignor to Robert L. Kahn, Chicago, Ill.

Application August 2, 1940, Serial No. 349,938

10 Claims. (Cl. 219—8)

This invention relates to arc welders having a single phase alternating current supply and yielding a welding current having a direct current and alternating current components. This welder is particularly adapted for arcs of less than 200 amperes although I have used several such devices in parallel to supply current to one arc. The welder hereinafter described when used for supplying mixed direct and alternating current is preferably used in connection with gas discharge rectifiers and filtering circuits.

As is well known, a direct current arc is easier to strike than an alternating current arc, although the latter is easier to manipulate once it has been struck. In certain kinds of work direct current arcs are necessary; however, even in such cases, some alternating current components in the arc make the control of the arc easier on the part of the operator.

Arc welders with gaseous discharge rectifiers have been made but have proven unsuccessful. Thus, three-phase welders of this type without any filter circuit have been used. This type of a rectified current, however, has not proven satisfactory for arc welding for the reason that the direct current component is too great. Furthermore, at least three rectifiers are necessary and each portion of the system is not operated all the time. Thus a three-phase system of this type is generally more expensive and heavier than corresponding single phase equipment.

Single phase rectifiers with gaseous discharge rectifiers have also been used but have proven unsuccessful, particularly with regard to rectifier life. As a rule, such rectifiers have been short-lived because of either excessive current drawn or excessive potential or both.

A welder embodying my invention has been found to be free of the above disadvantages and yields arcs which may be struck easily, manipulated conveniently and whose effect on the rectifiers is such that rectifiers operate over long periods of time. In fact, I have determined that in most instances the rectifiers will have a life in excess of that specified by the manufacturer whereas the same rectifier used in a different welding circuit will be rendered inoperative within a space of a few hours or even less.

In general, this invention contemplates separate half-wave gaseous rectifiers supplied from a transformer having a high reactance and thus having poor regulation. The rectifiers are preferably of the type having a filamentary cathode particularly of the thoriated tungsten type. The gas is preferably argon at the pressures used in the so-called tungar type of rectifier. For example, such a rectifier is obtainable on the market under the trade-mark Rectigon. I have also used mercury vapor as a gas medium and while other gases may also be used, I prefer argon. The cathode heating supply is important and consists of one or more transformers having excellent regulation characteristics and connected to the main supply line in advance of the remainder of the welder. These transformers for cathode heating are distinct and separate from the main supply transformer and are not to be part thereof.

In order to provide a convenient and efficient control over the amount of power drawn by the main supply transformer, a reactor is preferably connected in series with the transformer primary. The reactor and transformer together are so designed that upon a dead short circuit of the welder as when striking an arc, the current drawn by the entire system is limited to a quantity determined by the safe carrying capacities of the rectifiers.

The output of the rectifiers is fed to a one-section filter having a condenser input. By providing a condenser input, I have found that a higher voltage in the output circuit is created than is true without the filter. Furthermore, this type of a filter input results in comparatively large current variations through the rectifiers but does reduce the voltage variations to a marked degree. Furthermore, this type of a filter input has comparatively poor regulation so that as the current load increases, the voltage drops off.

The inductance in the filter is preferably of the type having an air gap thus having a high leakage reactance. The output of the inductance has a bleeder resistance connected to the other side of the line and another resistance is shunted across the inductance. The bleeder resistance is preferably large enough so that a small current of the order of a few amperes as, for example, about three amperes, will always flow even under open-circuit welder conditions. The entire filter is so designed that under such open-circuit conditions, the open-circuit potential across the welder is of the order of about 70 volts direct current with an alternating current component of the order of about 20 volts. In other words, the output potential varies from about 50 to about 90 volts across the welding electrodes. Under normal operating conditions with an arc, the voltage decreases so that the alternating potentials have peak values of about 15% of the direct current component. In other words, if the arc has a drop of about 20 volts, the alternating current components are of the order of three or four volts above and below this direct current value.

The condenser itself must be of comparatively large capacity and for an arc of about 120 amperes may be between 50 and 150 microfarads. An excessive capacitance will result in excessive potentials on the rectifiers and thus greatly reduce their life. Also, an excessive capacitance will result in excessive currents being drawn through the rectifiers. The output voltage of the rectifier on open circuit will also be too high. On the other hand, too small a condenser reduces the voltage below a desired value and makes striking an arc difficult. This is probably due to an insufficient voltage and also an insufficient direct current component.

By providing the filter section with the various resistances, I have observed that the regulation of the entire system is improved and that the shocks on the rectifiers are reduced to such a degree that between no load and full load there is very little change in the appearance of the discharge through the tubes and as previously pointed out, the life of the tubes is quite satisfactory. I believe that the maintenance of space current through the rectifiers at all times and limiting the value of such currents to the safe current carrying capacity thereof as well as limiting the potentials impressed on the rectifiers results in a remarkable freedom from cathode bombardment usually responsible for decreased life.

Referring to the drawing, Figure 1 shows a circuit diagram of the invention. Fig. 2 is a modification.

Referring first to Fig. 1, the main power supply lines 1 and 2 are adapted to supply alternating current of the usual 60 cycle variety, although the invention is applicable to other frequencies. Connected in line 1 is a reactor 3 of the iron core air gap type. This reactor is preferably tapped so that lead 4 may be connected at various points thereof. Leads 2 and 4 both connect to the terminals of primary winding 6 of a main current supply transformer 7. This transformer has a high leakage reactance with poor regulation and operates at a high flux density in the laminated iron core.

Transformer 7 has a secondary winding divided into two equal parts 8 and 9 by a center tap 10. The outer terminals of the secondary windings are connected by leads 11 and 12 to junctions 13 and 14 respectively. From junction 13 resistors 15 and 16 branch off to anodes 17 and 18 respectively of gaseous discharge rectifiers 19 and 20. Similarly from junction 14 resistors 21 and 22 go off to anodes 23 and 24 of rectifiers 25 and 26. Rectifiers 19 and 20 operate as one pair with the resistors 15 and 16 functioning to stabilize the load division. Rectifiers 23 and 24 operate similarly. Each pair may be replaced, if desired, by a single large rectifier although the arrangement shown has operated very well. However, no full wave rectifier in one discharge device is desired. Separate half wave units as far as rectifier tubes are concerned are to be used. In other words, rectifiers 19 and 23, for example, are not to be combined into one full wave rectifier.

The various rectifiers have cathodes 27 to 30 inclusive all connected by leads to the secondary winding 32 of a filament transformer 33, whose primary 34 is connected by leads 35 and 36 to line supply wires 1 and 2 ahead of the reactor and main supply transformer. Transformer 33 should have excellent regulation and should not permit the filament voltage to vary substantially under various load conditions. The secondary winding 32 should be heavy enough to carry welding currents without undue losses.

The rectifiers, as previously pointed out, are preferably of the thoriated cathode argon filled type with the argon at a relatively high pressure. The voltage across the rectifiers is preferably kept below 100 at all times and in fact at no load is preferably at about 90 peak value.

Secondary winding 32 has a center tap 40 and this with tap 10 constitutes the output terminals of the rectifier system and input terminals of the filter system. Connected across taps 10 and 40 is a filter condenser 41. This condenser has a large capacity and even by itself should have a substantial action. The action of this condenser together with the remainder of the system should be as previously discussed and can be definitely determined by observation of a welder as specified later.

Tap 40 has also connected thereto an inductance 42 having an iron core with an air gap. This inductance has a by-pass resistor 43 shunted across it. From terminal 44 across to lead 45, connected to tap 40, a bleeder resistor 46 is connected. The terminals 47 and 48 of this bleeder resistor constitute the welder terminals across which an arc may be struck.

The two resistors 43 and 46 protect the rectifiers against potential surges arising from arc current variations and extinguishing of the arc. Resistor 43 serves inductance 42 and permits high self-induced potentials to die out rather than be impressed across the tube terminals. Bleeder resistor 46 maintains a small current through the rectifiers and filter even under open circuit welder conditions and appears to prevent the open circuit potential from going to excess.

It is possible that by-pass resistor 43 also functions to pass some alternating current components at heavy load that might otherwise be suppressed.

The entire filter operates so that on open circuit, a low current is drawn having a strong direct current component and having alternating current components of the order of about thirty per cent of the direct current; i. e., about 70 volts with 20 volts peak value on either side thereof. At normal welding loads of about 50 to 125 amperes the alternating current component falls off to about 15 per cent, the arc potential being about 18 to 20 volts direct current.

As an actual example, a welder for operation on 220 volts 60 cycle line was constructed as follows:

Reactor 3 consisted of silicon steel laminations, 24 gauge. The entire core had a cross section of 1½ inches square, 7 inches by 4 inches provided with two .014 inch air gaps and wound with 200 turns of #10 square wire. Taps were provided above 65 turns so that 65 turns were always in circuit. Inductance 42 had the same core but had 70 turns of #4 wire.

Transformer 7 had a laminated core of 2 x 3 inch cross section of the shape shown. The primary had 200 turns while the secondary had 102 turns wound over the primary. The wire should be heavy enough to carry the currents. For heavy duty continuous use, the primary wire may be #7 square and the secondary may be #5.

Condenser 41 was 100 microfarads although this value may be varied quite a bit. Resistors 43 and 46 were 50 and 70 ohms respectively. Resistors 15, 16, 21 and 22 may be about .5 ohm each, although this value is not critical.

In certain instances, an alternating current arc may be desired. Thus certain types of welding rods are made for alternating current arcs. In such a case, the rectifier may be rendered inoperative by opening the filament supply line 35. Connections from 11 and 12 may be established to 40 and 45 respectively while tap 10 is disconnected from 45. Thus raw alternating current is impressed on the filter. Because of the reactor 3 as well as the filter and rectifying action of the arc itself, there will be considerable distortion of the alternating wave shape.

Referring to Fig. 2, transformer 7 has a pair of secondary windings each divided into halves 8', 9', and 8" and 9" respectively by center taps 10' and 10", these two being connected together. The outer terminals of each secondary winding 11', 12', 11" and 12" are connected as shown to the anodes, of individual half wave rectifiers. The output terminals of the rectifiers are similar to that shown in Fig. 1. In Fig. 2, no coupling resistors between rectifiers are necessary. By having two secondaries on transformer 7', the rectifier loads will be balanced through transformer action.

As previously pointed out, two separate units may be paralleled together on one welding arc. The unit may also be used for other purposes besides welding. Thus modern storage batteries for automobiles and airplanes have thin enough plates so that heavy charging currents may be applied. The characteristics of the units are desirable for this purpose. Other applications are also possible.

The unit as described operates satisfactorily over current ranges of about 3 amperes through the filter on no load to almost 200 amperes on a short circuit. For ordinary arc welding, the current may be varied from about 125 amperes down to less than 15 amperes. Over the entire range of current on ordinary arc load, the unit maintains its flexible characteristics of limiting the current at short circuit prior to striking the arc, with a heavy direct current component to enable easy striking of the arc. Once the arc is established, the arc current has substantial alternating current components superimposed on the direct current thus making it easy and smooth to manipulate.

Reactor 3 may be replaced by a suitable resistor if desired. It is also possible to combine the reactor and transformer into one but this requires careful design and makes the entire cost greater as a rule. In the unit previously described, the rectifiers were of the Rectigon type having 2.5 volt filaments and rated at 15 amperes continuous duty. The argon discharge is steady with a tube drop of about 8 volts. The A. C. potential across the tubes under open circuit is about 50 to 55 volts; i. e., the full voltage across the transformer secondary from end to end is about 100 to 110 volts.

This application is a continuation-in-part of my application Serial No. 258,927, filed February 28, 1939.

What is claimed is:

1. An arc welder for use on a single phase alternating current supply line comprising a high leakage reactance transformer having its primary connected to the supply line and having a secondary, at least two half wave rectifiers, connections including output terminals between said secondary and rectifiers for full wave rectification, a condenser connected across the output terminals of said rectifier system, an inductance connected in one side of said output, a by-pass resistance shunted across said inductance, and a bleeder resistance connected across the output on the side of the inductance remote from the condenser, said bleeder resistance terminals constituting the welder output terminals and having no other condensers or inductances between said first-named condenser and welder output terminals.

2. The system of claim 1 wherein a reactor in series with the transformer primary is provided, said reactor and transformer regulation being such as to limit the current under short circuit welder conditions to a value of about two times the normal welding current.

3. A welder comprising a source of single phase alternating current, a full wave rectifier connected thereto and having output terminals, and a condenser input filter section connected across said output terminals, said section having a condenser across the input, a high leakage iron core inductance in one side only, and only a bleeder resistance directly across the output and arc sustaining electrodes connected across said bleeder resistance.

4. The system of claim 3 wherein said inductance has a by-pass resistance across it.

5. A welder for single phase alternating current supply comprising a high leakage reactance transformer having primary and secondary windings said primary being adapted to be connected to a supply line, a full wave gaseous discharge hot cathode type of rectifier with half wave rectifiers separate from each other, connections from said secondary to said rectifier, output terminals for said rectifier, a condenser across said output, a high leakage iron core inductance connected to one output terminal only, only a bleeder resistance connected from the free inductance terminal to the other output terminal and a resistance across said inductance.

6. The system of claim 5 wherein said hot cathode type rectifier consists of thoriated tungsten filaments and wherein a filament current supply electrically and magnetically independent of said transformer s provided, said supply consisting of a transformer connected across the current source in advance of the main transformer.

7. A welder comprising an iron core reactor, a transformer having a primary in series with said reactor for connection to a line supply of single phase alternating current, said transformer having a secondary, at least two half wave hot cathode gaseous discharge rectifiers connected to said secondary for full wave rectification, output terminals for said rectifiers, a condenser across said terminals, a bleeder resistance in shunt therewith, an iron core high leakage inductance between said condenser and bleeder on one side of the output, a by-pass resistor across said inductance, a separate filament transformer having a primary connected to said supply line ahead of said reactor and other primary, said filament transformer secondary supplying heating current to said cathodes.

8. The system of claim 7 wherein said first named transformer has two secondaries, with four half wave rectifiers, two being connected to each secondary and the entire rectifiers connected to form two parallel full wave units.

9. The system of claim 7 wherein said condenser has a value of between 50 and 150 microfarads in a unit handling up to about 200 amperes with a maximum potential of about 100 volts.

10. A welder for arcs of the order of 100 amperes comprising a single phase alternating current transformer having a high leakage reactance and adapted to supply secondary currents of about 90 volts, half wave argon filled thoriated tungsten cathode type of rectifiers connected for full wave rectification to said secondary, said rectifiers having output terminals, an independent filament transformer for said rectifiers connected ahead of said first transformer to a supply line, said filament transformer having a center tapped secondary functioning as one terminal of the full wave rectifier system, a condenser of between 50 and 150 microfarads across said output terminals, an inductance having an iron core with an air gap with one terminal connected to the other output terminal and having a free terminal, a resistance of the order of 50 ohms across said inductance, and a bleeder resistance of the order of 70 ohms connected from the free inductance terminal to the one rectifier output terminal.

ROBERT E. WEIR.